United States Patent
Goldschmidt et al.

(10) Patent No.: US 8,171,227 B1
(45) Date of Patent: May 1, 2012

(54) SYSTEM AND METHOD FOR MANAGING A FLOW BASED REPLY CACHE

(75) Inventors: Jason L. Goldschmidt, Brookline, MA (US); Peter D. Shah, Waltham, MA (US); Thomas M. Talpey, Stow, MA (US)

(73) Assignee: NetApp, Inc., Sunnyvale, CA (US)

( * ) Notice: Subject to any disclaimer, the term of this patent is extended or adjusted under 35 U.S.C. 154(b) by 478 days.

(21) Appl. No.: 12/401,993

(22) Filed: Mar. 11, 2009

(51) Int. Cl.
G06F 13/00 (2006.01)

(52) U.S. Cl. ......... 711/136; 711/121; 711/129; 711/148

(58) Field of Classification Search .................. 711/121, 711/129, 136, 148
See application file for complete search history.

(56) References Cited

U.S. PATENT DOCUMENTS

| | | |
|---|---|---|
| 3,771,137 A | 11/1973 | Barner et al. |
| 4,075,686 A | 2/1978 | Calle et al. |
| 4,156,907 A | 5/1979 | Rawlings et al. |
| 4,268,907 A | 5/1981 | Porter et al. |
| 4,399,503 A | 8/1983 | Hawley |
| 4,476,526 A | 10/1984 | Dodd |
| 4,500,954 A | 2/1985 | Duke et al. |
| 4,504,902 A | 3/1985 | Gallaher et al. |
| 4,598,357 A | 7/1986 | Swenson et al. |
| 4,669,043 A | 5/1987 | Kaplinsky |
| 4,688,221 A | 8/1987 | Nakamura et al. |
| 4,698,808 A | 10/1987 | Ishii |
| 4,723,223 A | 2/1988 | Hanada |
| 4,761,785 A | 8/1988 | Clark et al. |
| 4,779,189 A | 10/1988 | Legvold et al. |
| 4,800,489 A | 1/1989 | Moyer et al. |
| 4,805,090 A | 2/1989 | Coogan |
| 4,831,520 A | 5/1989 | Rubinfeld et al. |
| 4,837,675 A | 6/1989 | Bean et al. |
| 4,864,497 A | 9/1989 | Lowry et al. |
| 4,868,734 A | 9/1989 | Idleman et al. |
| 4,888,691 A | 12/1989 | George et al. |
| 4,896,259 A | 1/1990 | Jacobs et al. |
| 4,899,342 A | 2/1990 | Potter et al. |
| 4,905,141 A | 2/1990 | Brenza |
| 4,972,316 A | 11/1990 | Dixon et al. |
| 4,989,206 A | 1/1991 | Dunphy, Jr. et al. |
| 5,016,165 A | 5/1991 | Tanikawa et al. |
| 5,119,485 A | 6/1992 | Ledbetter, Jr. et al. |
| 5,124,987 A | 6/1992 | Milligan et al. |

(Continued)

OTHER PUBLICATIONS

U.S. Appl. No. 12/105,914, filed Apr. 18, 2008, entitled Flow Based Reply Cache, by Talpey et al., 31 pages.

(Continued)

Primary Examiner — Reba I. Elmore
(74) Attorney, Agent, or Firm — Cesari and McKenna, LLP

(57) ABSTRACT

A system and method determines when the entries of a reply cache, organized into microcaches each of which is allocated to a client connection, may be retired or released, thereby freeing up memory structures. A plurality of connection statistics are defined and tracked for each microcache and for the entries of the microcache. The connection statistics indicate the value of the microcache and its entries to the client. The connection statistics include a measure of the time since the last idempotent or non-idempotent request (TOLR) was received, and a count of the number of idempotent requests that have been received since the last non-idempotent request (RISLR). A microcache with a TOLR time and a RISLR count that exceed respective thresholds may be expired and removed from the reply cache.

24 Claims, 6 Drawing Sheets

U.S. PATENT DOCUMENTS

| | | | |
|---|---|---|---|
| RE34,100 | E | 10/1992 | Hartness |
| 5,155,835 | A | 10/1992 | Belsan |
| 5,175,825 | A | 12/1992 | Starr |
| 5,179,702 | A | 1/1993 | Spix et al. |
| 5,185,694 | A | 2/1993 | Edenfield et al. |
| 5,206,939 | A | 4/1993 | Yanai et al. |
| 5,276,823 | A | 1/1994 | Cutts, Jr. et al. |
| 5,283,884 | A | 2/1994 | Menon et al. |
| 5,297,258 | A | 3/1994 | Hale et al. |
| 5,313,612 | A | 5/1994 | Satoh et al. |
| 5,333,294 | A | 7/1994 | Schnell |
| 5,355,453 | A | 10/1994 | Row et al. |
| 5,388,242 | A | 2/1995 | Jewett |
| 5,388,243 | A | 2/1995 | Glider et al. |
| 5,426,747 | A | 6/1995 | Weinreb et al. |
| 5,524,205 | A | 6/1996 | Lomet et al. |
| 5,581,724 | A | 12/1996 | Belsan et al. |
| 5,778,431 | A | 7/1998 | Rahman et al. |
| 5,907,848 | A | 5/1999 | Zaiken et al. |
| 6,014,674 | A | 1/2000 | McCargar |
| 6,078,999 | A | 6/2000 | Raju et al. |
| 6,266,785 | B1 | 7/2001 | McDowell |
| 6,442,508 | B1 | 8/2002 | Liao et al. |
| 6,636,879 | B1 | 10/2003 | Doucette et al. |
| 6,671,773 | B2 | 12/2003 | Kazar et al. |
| 6,721,764 | B2 | 4/2004 | Hitz et al. |
| 6,732,293 | B1 | 5/2004 | Schneider |
| 6,856,993 | B1 | 2/2005 | Verna et al. |
| 6,910,154 | B1 | 6/2005 | Schoenthal |
| 7,062,675 | B1 | 6/2006 | Kemeny et al. |
| 7,093,072 | B2 | 8/2006 | Haskins |
| 7,234,076 | B2 | 6/2007 | Daynes et al. |
| 2003/0088814 | A1 | 5/2003 | Campbell et al. |
| 2004/0205295 | A1* | 10/2004 | O'Connor et al. ............ 711/129 |
| 2005/0055511 | A1 | 3/2005 | Schreter |

OTHER PUBLICATIONS

Gait, Jason, Phoenix: A Safe In-Memory File System. Communications of the ACM, 33(1): pp. 81-86, Jan. 1990.

Kazar, Michael L., et al., Decorum File System Architectural Overview, USENIX Summer Conference, Anaheim, California, 1990, 13 pages.

Lorie, Raymond, A, Physical Integrity in a large segmented database, ACM Trans. Database Systems, 2(1): 91-104, Mar. 1977.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective On The Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, in Security and Persistence, Rosenber, J. & Keedy, J.L. (ed), Springer-Verlag (1990) pp. 229-245.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Rosenblum, Mendel, et al. The Design and Implementation of a Log-Structured File System Jul. 24, 1991 pp. 1-15.

Sandberg, Russel et al., Design and implementation of the Sun Network Filesystem. In Proc. Summer 1985 USENIX Conf., pp. 119-130, Portland OR (USA), Jun. 1985.

Satyanarayanan, M., et al., The ITC Distributed File System: Principles and Design, in Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Sidebotham, Bob, Volumes: The Andrew File System Data Structuring Primitive, EEUG Conference Proceedings, Manchester, UK, Autumn 1986.

Tanenbaum, Andrew S., "The Internet Transport Protocols (TCP and UDP)", Section 6.4: The Transport Layer, Computer Networks Third Edition, Mar. 1996, Prentice-Hall, Inc., Upper Saddle River, New Jersey, pp. 521-542.

Juszczak, Chet, "Improving the Performance and Correctness of an NFS Server", Winter 1989 USENIX Conference Proceedings, USENIX Association, Feb. 1989, Berkeley, CA, 11 pages.

U.S. Appl. No. 12/148,930, filed on Apr. 23, 2008, titled Persistent Reply Cache Integrated With File System, by David B.Novack et al., 46 pages.

Shepler, S., et al., "NFS Version 4 Minor Version 1 (draft-ietf-nfsv4-minorversion1-21.txt)", Internet-Draft, http://www.nfsv4-editor.org/draft-21/draft-ietf-nfsv4-minorversion1-21-1n.txt, The IETF Trust, Feb. 25, 2008, 575 pages.

\* cited by examiner ously executed request, which could result
in an inappropriate error reply).

SYSTEM AND METHOD FOR MANAGING A FLOW BASED REPLY CACHE

CROSS-REFERENCE TO RELATED APPLICATIONS

The present application is related to commonly assigned U.S. patent application Ser. No. 12/105,914, which was filed on Apr. 18, 2008, by Jason L. Goldschmidt, Peter D. Shah, and Thomas M. Talpey for a FLOW BASED REPLY CACHE, and is hereby incorporated by reference in its entirety.

BACKGROUND OF THE INVENTION

1. Field of the Invention

The present invention relates to storage systems and, more specifically, to managing a reply cache used in a storage system.

2. Background Information

A storage system is a computer that provides storage services relating to the organization of information on writeable persistent storage devices, such as non-volatile memories and/or disks. The storage system typically includes a storage operating system that implements a file system to logically organize the information as a hierarchical structure of data containers, such as files and directories on, e.g., the disks. Each "on-disk" file may be implemented as set of data structures, e.g., disk blocks, configured to store information, such as the actual data for the file. A directory, on the other hand, may be realized as a specially formatted file in which information about other files and directories are stored. The storage operating system may include or have access to a memory manager, among other services.

The storage system may be further configured to operate according to a client/server model of information delivery to thereby allow many clients to access files and directories stored on the system. In this model, the client may comprise an application executing on a computer that "connects" (i.e., via a client connection) to the storage system over a computer network, such as a point-to-point link, shared local area network (LAN), wide area network (WAN) or virtual private network implemented over a public network, such as the Internet. Each client may request the services of the storage system by issuing file system protocol messages or requests, such as the Network File System (NFS) protocol requests, to the system over the client connection identifying one or more files to be accessed. In response, the file system executing on the storage system services the request and returns a reply to the client.

Broadly stated, the client connection is provided by a process of a transport layer, such as the Transmission Control Protocol (TCP) layer, of a protocol stack residing in the client and storage system. The TCP layer processes establish the client (TCP) connection in accordance with a conventional "3-way handshake" arrangement involving the exchange of TCP message or segment data structures. The resulting TCP connection is a reliable, securable logical circuit that is generally identified by port numbers and Internet Protocol (IP) addresses of the client and storage system. The TCP protocol and establishment of a TCP connection are well-known and described in A. Tanenbaum *Computer Networks*, (3rd Ed. 1996), particularly at pgs. 521-542.

Many versions of the NFS protocol utilize reply caches for their operation. A reply cache may serve many purposes, one of which is to prevent re-execution (replay) of non-idempotent operations by identifying duplicate requests. A non-idempotent operation refers to an operation that cannot be executed a second time and still return the same result as the first time it was executed. An example of a non-idempotent operation is a rename operation. By caching reply information for such operations, replies to duplicate requests may be rendered from cached information, as opposed to re-executing the operation with the file system. For example, assume a client issues an NFS request to the storage system, wherein the request contains a non-idempotent operation, such as a rename operation that renames, e.g., file A to file B. Assume further that the file system receives and processes the request, but the reply to the request is lost or the connection to the client is broken. A reply is thus not returned to the client and, as a result, the client resends the request. The file system then attempts to process the rename request again but, since file A has already been renamed to file B, the system returns a failure, e.g., an error reply, to the client (even though the operation renaming file A to file B had been successfully completed). A reply cache attempts to prevent such failures by recording the fact that the particular request was successfully executed, so that if it were to be reissued for any reason, the same reply will be resent to the client (instead of re-executing the previously executed request, which could result in an inappropriate error reply).

Another purpose of the reply cache is to provide a performance improvement through work-avoidance by tracking "in-progress" requests. When using a connectionless transport protocol, such as the User Datagram Protocol (UDP), the client typically retransmits a subsequent NFS request if a response is not received from the storage system upon exceeding a threshold (e.g., one second) after transmission of an initial NFS request. For an NFS request containing an idempotent operation having a large reply, such as read or read_directory (readdir) operation, the actual processing of the request by the file system could exceed this threshold for retransmission. Such in-progress requests are tracked so that any duplicate requests received by the system are discarded ("dropped") instead of processing duplicate file operations contained in the requests. This work-avoidance technique provides a noticeable performance improvement for the NFS protocol over the UDP protocol.

A known implementation of an NFS reply cache is described in a paper titled *Improving the Performance and Correctness of an NFS Server*, by Chet Juszczak, Winter 1989 USENIX Conference Proceedings, USENIX Association, Berkeley, Calif., February 1989, pgs 53-63. Broadly stated, this implementation places reply cache entries into a "global least recently used (LRU)" data structure, i.e., a list ordered by a last modified time for each entry. In response to processing a new NFS request from a client, a protocol server, e.g., an NFS server, executing on the storage system removes the oldest (thus, least recently used) entry from the list, clears its reply data and assigns the entry to the new request (thus invalidating the old cache entry). The reply cache implementation accords equal weight to all cached NFS replies and cache management is predicated on maintaining a complete record of the most recent replies in the reply cache using an LRU algorithm.

In general, clients utilizing the NFS protocol over the TCP protocol can retransmit NFS requests (if responses are not received from the storage system) a substantially long period of time after transmission of their initial requests. Such long retransmit times often result in active clients "starving" slower/retransmitting clients of entries in the reply cache, such that it is unlikely that a retransmitted duplicate non-idempotent request (in a deployment using NFS over TCP)

will be found in a global LRU reply cache. The ensuing cache miss results in a replay of the non-idempotent operation and, potentially, data corruption.

SUMMARY OF THE INVENTION

Briefly, the present invention relates to managing a flow based reply cache. The flow based reply cache may be organized into one or more microcaches each having a plurality of entries. Each microcache may be allocated to a client of the storage system, such that each client has a set of entries that is not shared with other clients. The flow based reply cache may be managed through the operation of a flow creator entity, a request processing entity and a scrubber engine. The flow creator entity may organize the flow based reply cache into microcaches. The request processing entity may process requests issued by the clients of the storage system. The scrubber engine may be configured to expire the entries of a microcache allocated to a client based on one more predefined criteria.

Specifically, the scrubber engine may designate a given client as active or inactive based on the time since the last request (idempotent or non-idempotent) was received from that client. If the time is below a time-out or threshold, then the scrubber engine may consider the client to be active. If the time is equal to or greater than the time-out or threshold, then the scrubber engine may consider the client to be inactive. If the given client is determined to be inactive, the scrubber engine may expire the entries of the microcache allocated to that client based on a first value. If, however, the client is determined to be active, the scrubber engine may expire the microcache entries based on a second value. The first and second values, moreover, may be selected or determined such that the entries of an active client are expired sooner than the entries of an inactive client. By expiring microcache entries, memory structures may be freed, and thus allocated to new clients.

In an embodiment, the flow creator or request processing entity includes a plurality of timers and counters. A first timer tracks the time since the last request (idempotent or non-idempotent) was received from a given client. A first counter counts the number of idempotent requests that have been received from the given client since the last non-idempotent request was received from the client. The value of the first counter may be adjusted based on the size of the microcache. The scrubber engine may monitor these timers and counters, and expire a microcache when the timer associated with that microcache meets or exceeds one value and the counter as adjusted meets or exceeds another value. The flow creator entity may assign the expired microcache to a new flow.

BRIEF DESCRIPTION OF THE DRAWINGS

The invention description below refers to the accompanying drawings, of which.

DETAILED DESCRIPTION OF ILLUSTRATIVE EMBODIMENTS

Overview

The present invention is directed to managing a flow based reply cache. Instead of using a global least recently used (LRU) implementation, cache entries are stored on a per-client connection basis. As used herein, the term "client connection" denotes either a TCP connection, UDP packets grouped into the same logical network data flow, or any other identifier, derived from underlying protocols, used to differentiate data sent from a client. A protocol server, which in an embodiment may be a Network File System (NFS) server although other protocol servers may be used, executing on a storage system maintains a microcache for each client connection or logical data flow to store and retrieve recent replies for requests, e.g., NFS requests, issued by a client. Each microcache may be dynamically managed and tuned for each data flow. By maintaining a microcache for each client connection in a non-global manner, the NFS server can prevent an aggressive client, e.g., a client issuing many requests, from starving a comparatively inactive client of reply cache resources.

The present invention is further directed to a system and method for determining when the entries of a microcache and a microcache itself may be retired or released, thereby freeing up memory structures for new entries and new client flows. In particular, embodiments of the invention provide, among other things, for a number of connection statistics that can be tracked for each flow, and for the entries of the flow. These connection statistics provide a measure of the flow's and the entries' value to the client, e.g., how likely it is that the entries will be needed by the client. Specifically, embodiments of the invention recognize, among other things, that simply expiring the oldest entries of a flow may be inefficient, as such entries may still be needed by the client. The connection statistics of embodiments of the invention, on the other hand, provide a better measure of the value of an entry to the client. Furthermore, the thresholds or limits used to evaluate the connection statistics may be tuned by a system administrator, thereby tailoring the system to the particular needs or characteristics of a given application or protocol.

Accordingly, with the present invention, there is no need for a global clock to track the entries of a reply cache, and expire "old" entries.

Storage Architecture

Figure 1:
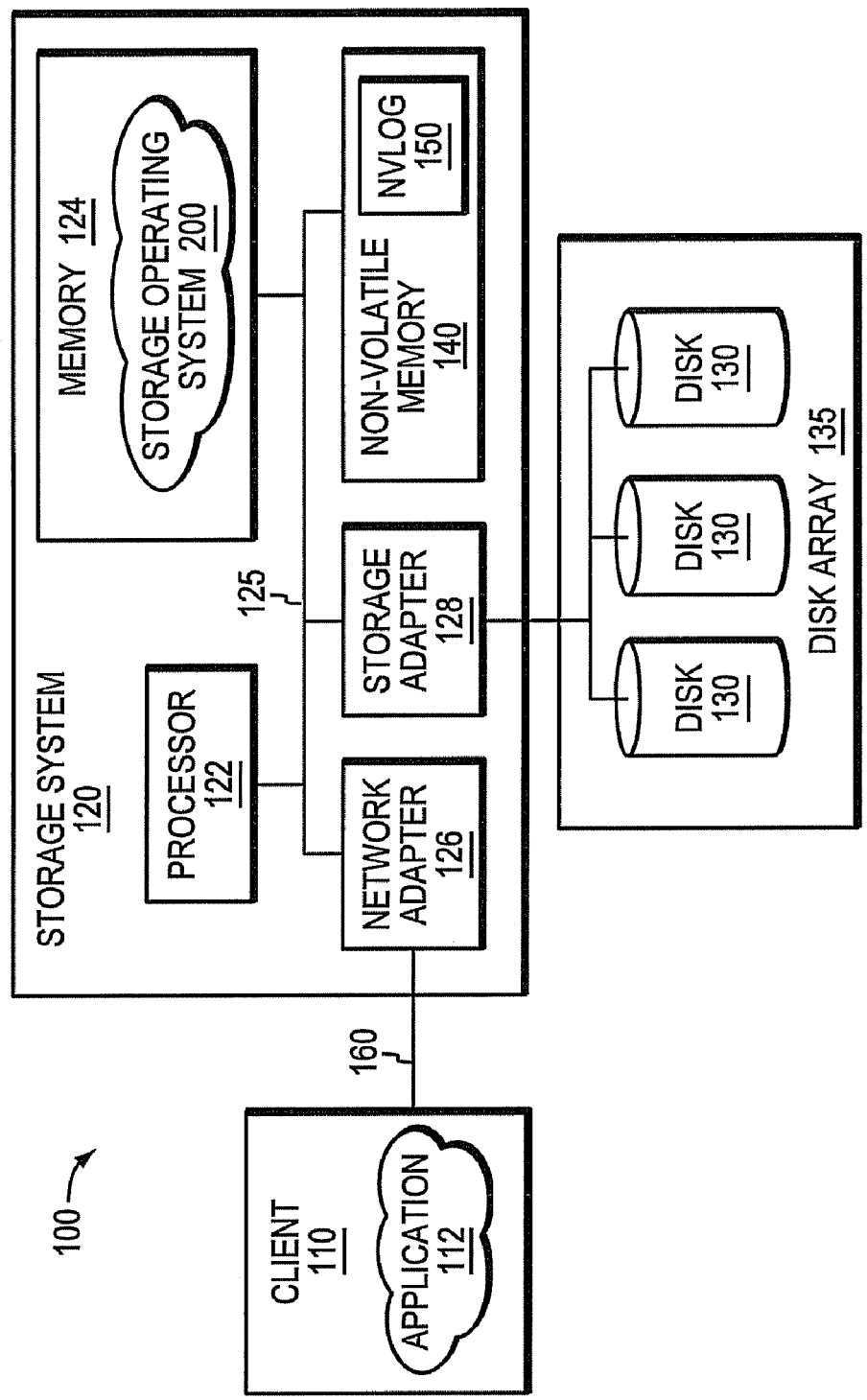
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system 120 is a computer that provides storage services relating to the organization of information on writable persistent storage devices, such as disks 130 of disk array 135. To that end, the storage system 120 comprises a processor 122, a memory 124, a network adapter 126, a storage adapter 128 and non-volatile memory 140 interconnected by a system bus 125. The storage system 120 also includes a storage operating system 200 that implements a virtualization system to logically organize the information as a hierarchical structure of data containers, such as files, directories and logical units, on the disks 130.

The memory 124 comprises storage locations that are addressable by the processor 122 and adapters 126, 128 for storing software programs and data structures associated with the embodiments described herein. The processor and adapters may, in turn, comprise processing elements and/or logic circuitry configured to execute the software programs and manipulate the data structures. The storage operating system 200, portions of which are typically resident in memory 124 and executed by the processing elements, functionally organizes the storage system by, inter alia, invoking storage operations in support of software processes executing on the system. It will be apparent to those skilled in the art that other processing and memory elements, including various computer readable media, may be used to store and execute program instructions pertaining to the inventive technique described herein.

The non-volatile memory 140 comprises electronic storage illustratively embodied as a solid-state, non-volatile random access memory (NVRAM) array having either a back-up battery or other built-in last-state-retention capabilities (e.g., non-volatile semiconductor memory) that hold the last state of the memory in the event of any power loss to the array. As described herein, a portion of the non-volatile memory 140 is organized as temporary, yet persistent, non-volatile log storage (NVLOG) 150 capable of maintaining information in light of a failure to the storage system 120.

The network adapter 126 comprises the mechanical, electrical and signaling circuitry needed to connect the storage system 120 to a client 110 over a computer network 160, which may comprise a point-to-point connection or a shared medium, such as a local area network (LAN). The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging packets over the network 160. The clients may issue packets including file-based access protocols, such as the Common Internet File System (CIFS) protocol or NFS protocol, over TCP/IP when accessing information in the form of files. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the storage system 120 to access information requested by the client 110. The information may be stored on the disks 130 of the disk array 135 or other similar media adapted to store information, such as flash memory. The storage adapter 128 includes input/output (I/O) interface circuitry that couples to the disks 130 over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the network adapter 126, where the information is formatted into one or more packets and returned to the client 110.

The disks 130 of the array 135 are illustratively organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations, as well as other forms of redundancy, may be used in accordance with the inventive principles described herein.

Figure 2:
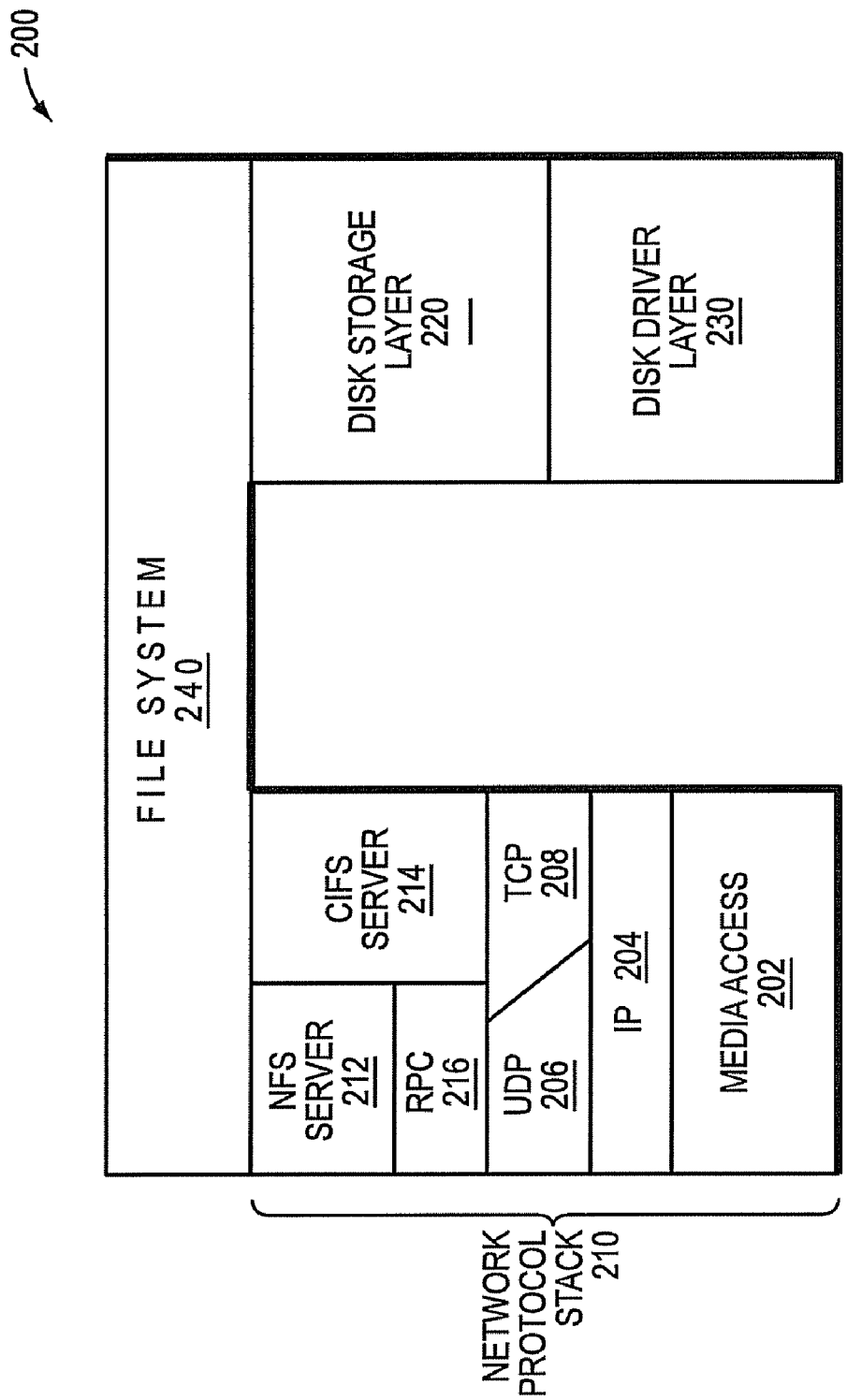
FIG. 2 is a schematic block diagram of a storage operating system that may be advantageously used with the present invention.

FIG. 2 is a schematic block diagram of the storage operating system 200 that may be advantageously used with the present invention. In an illustrative embodiment described herein, the storage operating system is preferably the NetApp® Data ONTAP™ operating system available from NetApp, Inc., of Sunnyvale, Calif., which implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to the file system component of any storage operating system that is otherwise adaptable to the teachings of this invention.

The storage operating system comprises a series of software layers, including a network driver layer (e.g., a media access layer 202, such as an Ethernet driver), network protocol layers (e.g., the IP layer 204 and its supporting transport mechanisms, the UDP layer 206 and the TCP layer 208), as well as a protocol server layer (e.g., a NFS server 212, a CIFS server 214, etc.) and a presentation layer configured to provide bindings for the transport mechanisms (e.g., a RPC layer 216) organized as a network protocol stack 210. In addition, the storage operating system 200 includes a disk storage layer 220 that implements a disk storage protocol, such as a RAID protocol, and a disk driver layer 230 that implements a disk access protocol such as, e.g., a SCSI protocol.

Bridging the disk software layers with the network and protocol server layers is a virtualization system that may be abstracted through the use of a database management system, a volume manager or, as described herein, a file system 240. The file system 240 illustratively provides logical volume management capabilities for use in access to the information stored on the storage devices, such as non-volatile memory 140 and disks 130. That is, in addition to providing file system semantics, the file system 240 provides functions normally associated with a volume manager. These functions include (i) aggregation of the disks, (ii) aggregation of storage bandwidth of the disks, and (iii) reliability guarantees, such as mirroring and/or parity (RAID).

The file system 240 illustratively implements the WAFL file system having an on-disk format representation that is block-based using, e.g., 4 kilobyte (kB) blocks and using index nodes ("modes") to identify files and file attributes (such as creation time, access permissions, size and block location). The file system uses files to store meta-data describing the layout of its file system; these meta-data files include, among others, an mode file. A file handle, i.e., an identifier that includes an mode number, is used to retrieve an mode from disk.

Operationally, a request from the client 110 is forwarded as one or more data packets over the computer network 160 and on to the storage system 120 where it is received at the network adapter 126. A network driver of the protocol stack 210 processes the packet and, if appropriate, passes it on to a network protocol and protocol server layer for additional processing prior to forwarding to the file system 240. Here, the file system generates operations to load (retrieve) the requested data from storage media, such as a disk, if it is not resident "in core", i.e., in the memory 124. If the information is not in the memory, the file system 240 indexes into the mode file using the mode number to access an appropriate entry and retrieve a logical volume block number (vbn). The file system then passes a message structure including the logical vbn to the disk storage layer 220; the logical vbn is mapped to a disk identifier and physical block number (disk, pbn) and sent to an appropriate driver (e.g., SCSI) of the disk driver layer 230. The disk driver accesses the pbn from the specified disk and loads the requested data block(s) in the memory 124 for processing by the storage system 120. Upon completion of the request, the storage system (and operating system) returns a reply to the client 110 over the network 160.

It should be noted that some or all of the software "path" through the storage operating system layers described above may alternatively be implemented in hardware. That is, in an alternate embodiment of the invention, a storage access request data path may be implemented as logic circuitry embodied within a field programmable gate array (FPGA), an application specific integrated circuit (ASIC), or other hardware elements. This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Flow Based Reply Cache

As noted, the present invention is directed to managing a flow based reply cache of a storage system. The flow based reply cache is illustratively organized into one or more microcaches, each having a plurality of reply cache entries. Each microcache is maintained by a protocol server executing on the storage system and is allocated on a per client basis. To that end, each client is identified by its client connection or logical "data flow" (e.g., client (source) and storage system (destination) connection identifiers) and is allocated its own microcache and associated entries, as needed. As used herein, a connection identifier refers to a token which uniquely identifies a client's logical request stream. The token is derived from information describing the client's association with the server. This information includes, but is not limited to, explicit identifiers and/or transport identifiers, such as network (IP) addresses, network ports and transport protocols. As a result, each microcache of the reply cache may be used to identify a logical stream of client requests associated with a data flow, as well as to isolate that client stream from other client streams and associated data flows used to deliver other requests served by the system. The use of microcaches thus provides a level of granularity that enables each client to have its own pool of reply cache entries that is not shared with other clients, thereby obviating starvation of entries allocated to the client in the reply cache.

The flow based reply cache is illustratively implemented in memory 124 and has an in-core structure configured for use by the protocol server when cooperating with the file system 240. Nonetheless, those skilled in the art will understand that the reply cache may be stored in other memory locations, or distributed across a plurality of locations, among other modifications. The file system, in turn, operates in an integrated manner with the use of non-volatile memory 140, a portion of which is organized as the NVLOG 150. Many requests executed (processed) by the file system 240 are recorded in the NVLOG, with each request being considered complete once the NVLOG record is marked complete. Execution of these requests generally requires some type of state change and, as such, the requests are considered non-idempotent requests including, e.g., rename requests.

As an example, assume the file system executes a client request (forwarded by the protocol server of the network protocol stack 210) to rename a file from A to B. Broadly stated, the file system 240 executes (processes) the request by, e.g., retrieving appropriate blocks of a directory from disk 130, loading the blocks into the memory 124 and changing (modifying) the blocks, including an appropriate block (entry) of the directory to reflect renaming of the file to B. The file system then marks the modified memory (e.g., buffer cache) blocks, including the directory entry block that now contains the name B for the file, as "dirty" so that they may be written to disk. At this point, the file system 240 does not write the dirty blocks to disk, but instead waits until execution of a consistency model event, e.g., a consistency point (CP), of the system.

Meanwhile, the file system creates a file system operation record of the request and stores the record in the NVLOG 150. Subsequently during the CP, the contents of the record are not written (flushed) to disk, but rather the processing results of those contents (as represented in the dirty buffer cache blocks) are flushed to disk. That is, only the dirty buffer cache blocks (and not the file system operation record) are written to disk. However, once the changes to be made to the file system are essentially reflected in the file system operation record and stored in the NVLOG, processing of the request is considered complete and the file system notifies the protocol server of such completion. The protocol server thereafter generates a reply containing information indicating, e.g., a successful completion of the request, and returns the reply to the client 110. In addition, the protocol server stores the reply in the reply cache so that it can reply to any duplicate requests without consulting the file system.

In an illustrative embodiment, each client 110 creates a client connection (e.g., a TCP connection) with the protocol server (e.g., NFS server 212) executing on the storage system 120 to issue requests (e.g., NFS requests) of a logical stream to the server. In response to creating the connection or data flow associated with the client, the NFS server allocates a microcache to the data flow. The microcache is illustratively embodied as a "bin" having allocated entries or "buckets" into which are loaded replies associated with the requests of the stream issued by the client. The depth of the microcache illustratively comprises an estimated number of allocated entries that is managed as described herein.

The NFS server 212 illustratively allocates each flow the same size microcache, e.g., 100 entries, wherein each entry has a size sufficient to accommodate a request of the stream. In response to reception of a new request, a free entry in the microcache, if available, is used to accommodate/satisfy the new request.

Figure 3:
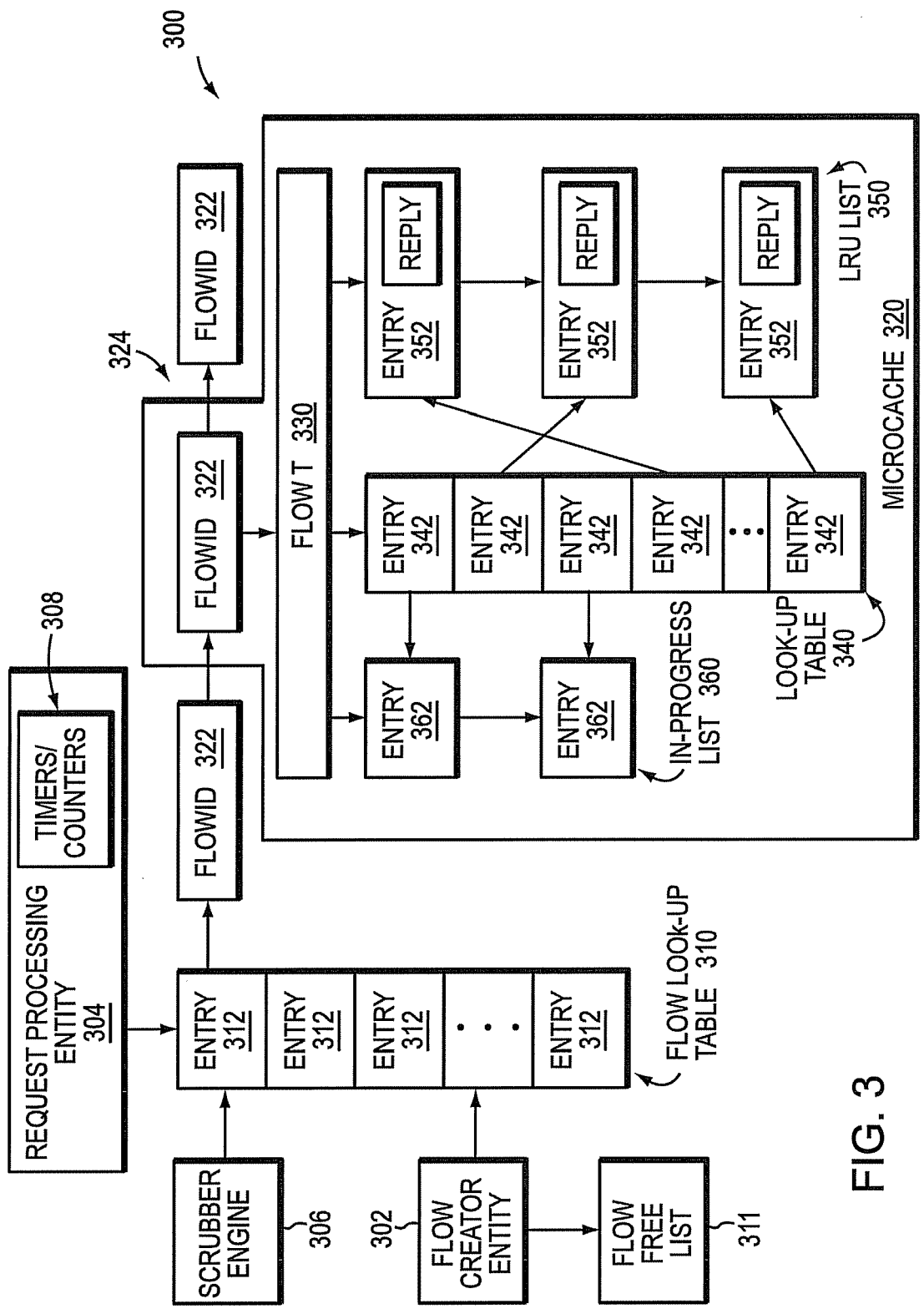
FIG. 3 is a schematic block diagram illustrating a flow based reply cache according to the present invention.

FIG. 3 is a schematic block diagram illustrating an embodiment of the flow based reply cache 300 according to the present invention. The NFS server 212 illustratively sorts and manages the entries of the reply cache 300 by logical data flow; accordingly, each logical data flow is associated with its own portion of the reply cache (i.e., a microcache) maintained by the NFS server. To that end, the flow based reply cache 300 includes a data structure, e.g., a flow look-up table 310, having a plurality of entries 312, each of which contains a reference (e.g., a logical data flow) to a microcache 320. The flow look-up table 310 is illustratively embodied as a hash table, in which client connection information is hashed to a specific entry 312. Nonetheless, those skilled in the art will understand that the flow look-up table may be implemented in other ways. As a result, the contents of the look-up table 310 function as indexes used by the NFS server 212 to reference (point to) logical data flows using the client connection information. Note that the information involved with the lookup operation may be cached so that it can be accessed efficiently and accurately, and so that the appropriate bin (microcache) can be identified quickly.

In an embodiment, the NFS server 212 may include a flow creator entity 302, a request processing entity 304, and a scrubber engine 306, as described herein, for managing the flow based reply cache. The request processing entity 304, moreover, may include or have access to one or more timers and/or counters, designated generally as 308. Specifically, a Time Of Last Request (TOLR) timer may be maintained for each flow. In addition, a Requests In Since Last (non-idempotent) Reply (RISLR) count may be maintained for each flow. Furthermore, a timer may also be associated with each entry of a flow. The TOLR and RISLR values provide an indication of whether the respective client connection is active, and are used among other things to determine the value of the microcache entries to the client. The reply cache 300 may further include a flow free list 311. The free list 311 represents memory structures that are not returned to a memory manager of the storage operating system 200. Instead, these memory structures are maintained by the NFS server 212 for quick access as needed.

The flow creator entity 302, request processing entity 304, and scrubber engine 306 may comprise registers and combinational logic configured and arranged to produce sequential logic circuits. In an embodiment, the flow creator entity 302, request processing entity 304, and scrubber engine 306 are software modules or libraries containing program instructions pertaining to the methods described herein, that may be stored on computer readable media, such as memory 124 and/or on a computer readable medium, and are executable by one or more processing elements, such as processor 122. Those skilled in the art will understand that the present invention may be implemented in an other ways, such as through various combinations of software and hardware, including firmware.

A limit may be set on the maximum number of flows that can be created by the server 212. In particular, a system administrator may specify the maximum number of flows. The specified maximum number of flows may be based, at least in part, on the amount of memory available to the server and the expected number of clients. The maximum number may be selected such that the server is not frequently approaching the number during operation.

In an illustrative embodiment, each logical data flow is represented in memory 124 by a flow data structure comprising two parts: (i) an identifier structure or component (hereinafter "FlowID") 322 used by the NFS server 212 to identify a particular logical data flow, and (ii) a main body component (hereinafter "FlowT" 330 and its supporting data structures, as described herein) containing the actual reply cache information and statistics for the data flow. Each FlowID 322 is considered part of a FlowT 330 with which it is associated. As used herein, the terms "FlowID/FlowT pair" and "FlowT" may be used interchangeably. The FlowID/FlowT pair may continue to exist well beyond a connection (associated with the logical data flow) being closed by the client, e.g., the pairing may exist for the life of the NFS server 212.

Specifically, the FlowID is the structure pointed to (referenced) by the hashed entry 312 of the flow look-up table 310. The client connection information is stored in the FlowID 322 and illustratively includes (i) the client IP address, (ii) client port number, (iii) transport protocol and (iv) server IP address. Nonetheless, those skilled in the art will understand that other or additional connection information may be used. Each microcache 320 of the reply cache 300 is thus identifiable using information stored in an associated FlowID 322. The FlowID 322 also contains all of the information needed for the NFS server 212 to locate associated reply cache information in memory 124.

Once an entry 312 of the look-up table 310 is hashed, the server 212 may search through a hash chain 324 (linked list) of FlowIDs 322 referenced by that hashed entry for a matching logical data flow. Upon matching on a FlowID, the NFS server 212 may access the actual data structures of the FlowT 330, e.g., in a 2-dimensional array fashion. At the core of each FlowT 330 is a microcache look-up table 340 used to either locate free, available entries 352 for the microcache within a LRU list 350 or identify in progress entries 362 within an in-progress request list 360 allocated to each data flow. Note that the architecture of the flow based reply cache 300 provides two look-up (hash) tables because there are two levels of indirection and cache look-up operations. The first flow look-up table 310 is used to find the proper logical data flow or microcache 320, and the second microcache look-up table 340 is used to find an available entry 352 in the microcache 320.

Illustratively, the NFS server 212 uses different portions of information to perform the reply cache look-up operations. A first portion (e.g., TCP and IP layer information) pertains to the client connection and is used to perform a flow look-up operation to the flow look-up table 310. Thereafter, a second portion (e.g., RPC layer information) is used to discern duplicate requests, i.e., RPC information matching is used to determine if there is an existing entry in the reply cache (a duplicate request). The RPC information illustratively includes (i) a transaction identifier (XID) of the request, (ii) a version number of the RPC program (PROGNUM) executed on the storage system, and (iii) an RPC procedure number (PROC) of the action to be taken by the program.

For example, the microcache look-up table 340 contains entries 342 (e.g., indexes) that point to each reply cache entry, illustratively indexed using a hash based on the XID and matching based on XID, PROC, PROGNUM and a checksum. If the XID matches to a unique entry, the comparison stops. If, however such matching does not allow identification to a unique entry, then matching based on the additional RPC information is needed. The XID is chosen by the client to collate requests and replies. The XID is illustratively embodied as a value that increments with each client request and is seeded in a pseudo-random manner at boot time. The XID may be initialized to a predetermined value by the client; however, the XID is illustratively initialized as a pseudo-random number each time the client boots.

In an illustrative embodiment, each microcache 320 has a fixed number of reply cache entries specified by a system-defined constant, e.g., 100 entries as initially allocated to each newly created flow. When residing in the cache, a reply cache entry is on one of two lists, the LRU list 350 or the in-progress list 360. An entry on the in-progress list 360 denotes that a request has been received and is currently being processed by the file system 240, i.e., the NFS server 212 is waiting for the reply data to be loaded into the entry. Illustratively, the entry is marked as being in existence (assigned to a request) but not having a result of the processing and, thus, no reply has been sent to the client.

The LRU list 350 is illustratively an "age ordered" list (e.g., a doubly-linked list) that has a number of possible links (one to a next LRU entry that is younger, another to a previous LRU entry that is older and another to the end or tail of the LRU list, e.g., if the entry is the oldest). The LRU list is a property of the data flow, i.e., the flow maintains information about the head and tail of its LRU list. The LRU list is provided on a per flow (per bin) basis, i.e., one LRU list per flow.

As noted, each entry 342 of the microcache look-up table 340 is an index that points to a reply cache entry; however, that entry may assume different states. For example, a reply cache entry may be assigned a request that has been processed by the file system 240 and updated with reply data. Accordingly, the entry holds valid reply data within the reply cache and thus assumes a valid or completed state as represented by entry 352 of the microcache LRU list 350. Depending on the amount of time it has been residing in the cache, an entry 352 may thereafter assume an available or unused state. In contrast, the reply cache entry may be in an in-progress state, and thus represented by an entry 362 of in-progress list 360. When a new cacheable request arrives from a client 110, the NFS server 212 assigns a cache entry 352 associated with that client connection, updates that entry with information pertaining to the request, and inserts that entry on the in-progress list 360.

In an illustrative embodiment, the server maintains a "high watermark" of in-progress entries 362 in each microcache 320 to thereby provide an indication of the depth of that client's microcache. The high watermark is illustratively less than the full estimated depth, e.g., one-third, and provides an indication to the server 212 of the number of outstanding requests from that client 110. For example, if the high watermark reaches a certain number of in-progress entries, and does not increase from that mark, then the server has a sufficient indication that this may be the maximum number of requests that the client will have outstanding at one time. In addition, if the server 212 has received a request and has not sent a reply, the server knows that the request is outstanding. If the client has more outstanding requests than entries allocated in its microcache, then the server may allocate additional entries for the microcache 320. Illustratively, the server 212 may grow (increase) the microcache by a predetermined amount, e.g., one third.

When the request is completed, the entry is transferred from the in-progress list 360 to the beginning or head of the LRU list 350, because it is the most recently used, and the server 212 populates the entry's associated protocol reply structure with any information needed to formulate a response or reply to the original NFS request. In other words, once the file system has finished processing the request, the NFS server returns a reply to the client 110. The reply cache entry then transitions from the in-progress state to a valid or completed state, the reply data is loaded into the entry and the entry is inserted onto the LRU list 350.

Operation of the Flow Based Reply Cache

Figure 4A:
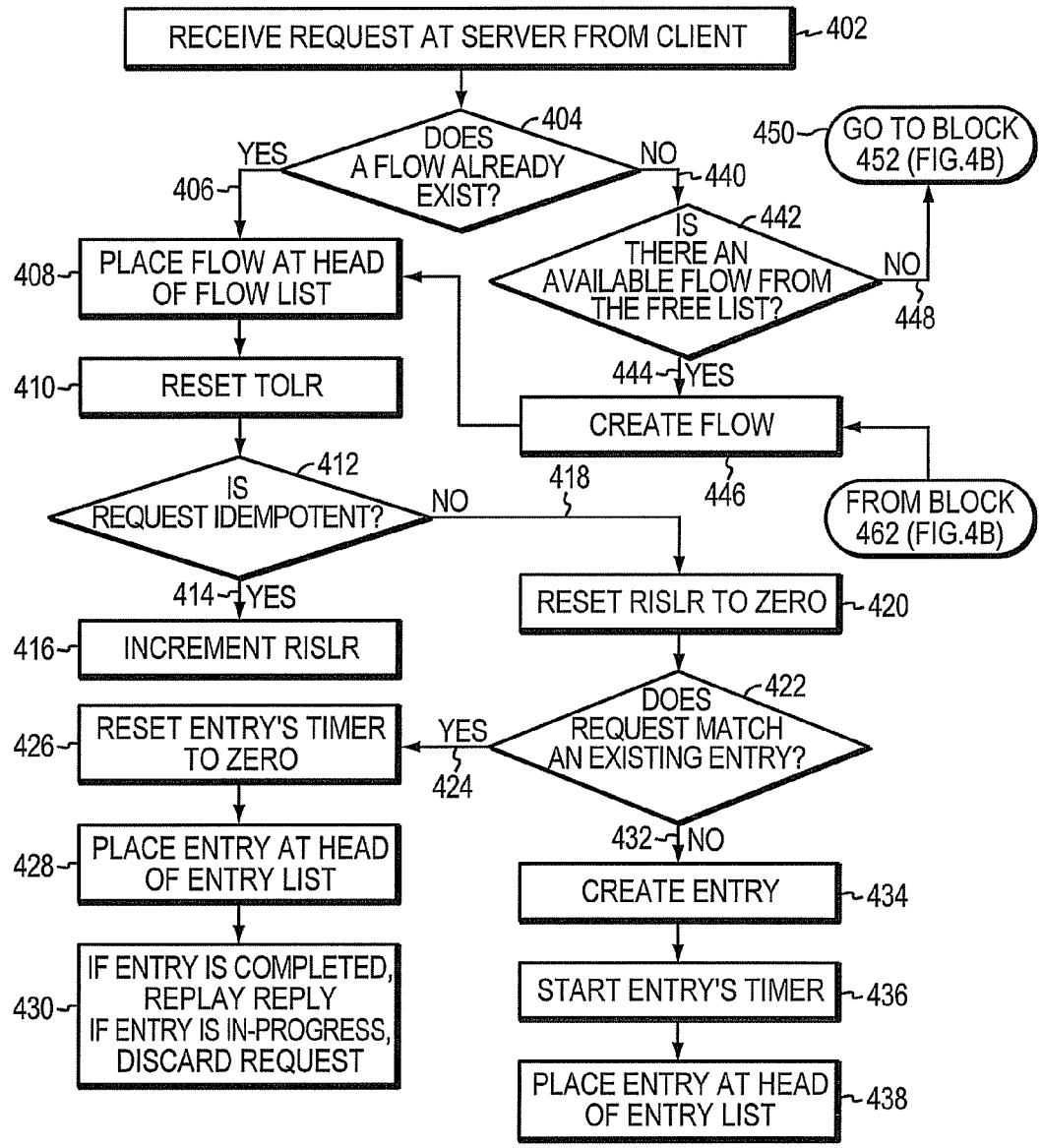
FIGS. 4A and 4B and 5 are flow charts illustrating operational procedures for the flow based reply cache.
Figure 4B:
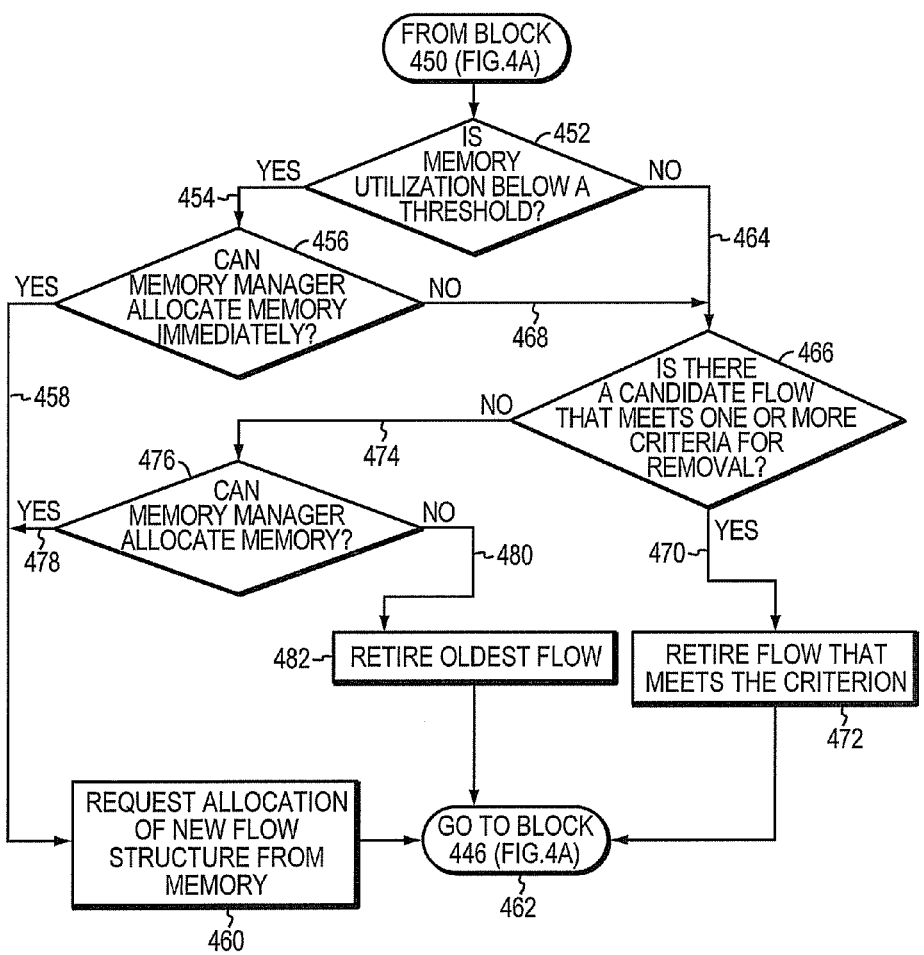
Figure 5:
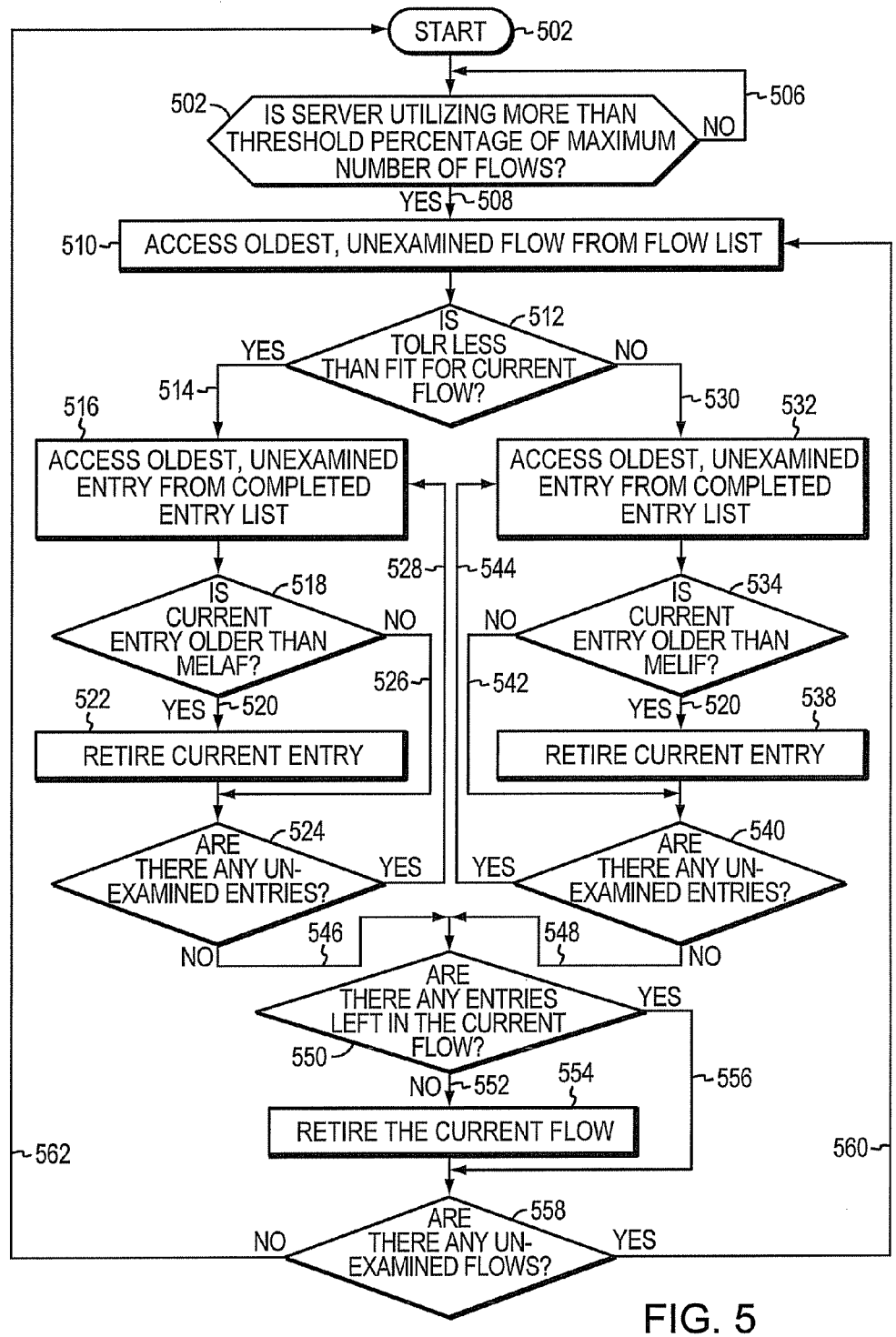

FIGS. 4 and 5 are flow diagrams of methods in accordance with embodiments of the invention. It should be understood that one or more initialization steps (not shown) may be performed, such as setting counters and timers to initial values, e.g., zero or null. A protocol server, such as NFS server 212, may receive a request, such as an NFSv3 request, from a client, as indicated at step 402. The request processing entity 308 may determine whether a flow already exists for this client connection, as indicated at decision step 404. Entity 308 may compute a hash value for the request as described above, e.g., based on connection information.

If the hash value matches an entry 312 in the flow look-up table 310, then a flow for this client already exists. That is, the reply cache includes a microcache established for this client flow. The request processing entity 308 searches the hash chain 324 of the respective entry 312 for the FlowID 322 for the client connection. The matching FlowID/FlowT pair identifies the microcache 320 for the client connection. The request processing entity 308 may place the flow at the head of the flow list, because it is the most recently used or accessed flow, as indicated by Yes arrow 406 leading to step 408. The request processing entity 308 may also reset the TOLR counter for the flow, as indicated at step 410. A determination may be made whether the request is idempotent, as indicated at decision step 412. If so, the RISLR counter for the flow may be incremented, as indicated by Yes arrow 414 leading to step 416. If the request is non-idempotent, the RISLR counter for the flow may be reset to zero, as indicated by No arrow 418 leading to step 420.

It should be understood that the RISLR counter alternatively may be zeroed when a reply is loaded into a microcache. Those skilled in the art will understand that the RISLR counter may be zeroed in response to other actions.

For non-idempotent requests, the request processing entity 308 may determine whether the request matches an existing entry of the microcache 320, as indicated at decision step 422. In particular, the request processing entity 308 may search for a matching entry in the look-up table 340 of the microcache 320 of the reply cache 300. That is, once a microcache (or bin) has been located, a look-up operation for the request (or bucket) may be performed in the microcache look-up table 340. If there is a match in step 422, i.e., the new request is a retransmission of a previous operation request, a reply for that previous request may be in the reply cache. The timer associated with the matching entry may be reset to zero, as indicated by Yes arrow 424 leading to step 426. The entry may also be placed at the head of the LRU list 350, as indicated at step 428, because it is the most recently used entry of the flow. If the matching entry is completed, the stored reply is replayed to the client and, if the entry is still in-progress, the request is discarded, as indicated at step 430.

Returning to step 422, if the request fails to match an existing entry, a new entry is created, as indicated by No arrow 432 leading to step 434. In an embodiment, a free entry is utilized for the new entry. The request processing entry 304 may utilize the last entry in the LRU list 350, assuming it is free, as the new entry. Entity 304 may also start the timer associated with this new entry, as indicated at step 436, and place the newly created entry at the head of flow's LRU list 350, as indicated at step 438.

If there is no free entry in the microcache, the request processing entity 304 may retire the oldest completed entry from the LRU list 350, and utilize this retired entry. However, such a situation may indicate that either the microcache is too small (the client is more active than estimated) or that there may be a problem (particularly if the server has replied to some of the requests) with, e.g., the network. Thus, by examining client activity on a per flow basis, the server can determine the behavior and needs of the client, e.g., whether the server is providing the necessary service/resources required by the client, which was absent in the prior art.

The request processing entity 304 also populates the cache entry 362 as described above with, e.g., information from the RPC request and may insert a reference (entry 342) to the populated entry into the microcache look-up table 340. Specifically, the cache entry is populated and inserted onto the microcache look-up table 340, so that the entry 342 can be indexed based on the hash of the XID (unique label of the bucket). Note that the cache entry 342 is not inserted onto the look-up table 340 in any particular order. Illustratively, the microcache look-up entry 342 remains valid until the reply cache entry 360 is removed from the LRU list 360, and recycled for a new request.

When the NFS server 212 receives an I/O completion from the file system, it may locate the logical data flow (microcache) relating to the operation request, e.g., in the flow look-up table 310. Here, the file system 240 has finished processing the request and generated a reply to the request. The reply cache entry 362 remains on the in-progress list 360 until the file system returns the I/O reply message indicating that processing of the request is complete. When receiving such a message, the NFS server associates the request with the connection on which the request originated. The server 212 then uses the client connection information stored in the I/O message to locate the logical data flow corresponding to that connection. In particular, the message is received from the file system (instead of the network) and the two-step look-up operation previously described is performed to find the FlowID, FlowT and the entry.

The NFS server 212 searches for the in-progress entry 362 using, e.g., the XID hash. Illustratively, a cacheable request should always be on the in-progress list 360 when the I/O reply message arrives from the file system 240. Upon locating the entry 362, the server 212 moves the entry from the in-progress list 360 to the head of the LRU list 350. The request's corresponding entry 342 in the microcache look-up table 340 remains unchanged. The NFS server also stores reply and protocol data in the cache entry (now represented as entry 352). At this point, the completed NFS request is considered entered into the microcache 320 of the reply cache 300. Reply data is loaded into the cache entry 352 so that the server can reply to any duplicate requests without consulting the file system.

Returning to decision block 404, if there is no match, i.e., there is no reference to a FlowID/FlowT pair for the client in the flow look-up table 310, the flow creator entity 302 determines whether there is an available flow from the free list 311, as indicated by No arrow 440 leading to decision step 442. If a flow is available from the free list 311, the flow creator entity 302 obtains a new FlowID/FlowT pair structure (i.e., microcache 320) from the free list 311 and creates the new flow, as indicated by Yes arrow 444 leading to step 446. The flow creator entity 302 inserts the structure into the FlowID hash chain 324, and processing moves to step 408, discussed above. If the free list 311 does not contain a free flow structure, the flow creator entity 302 may determine whether resources are in short supply. For example, the flow creator entity 302 may determine whether the server's utilization of memory is below a value, e.g., a threshold, such as a percentage of the maximum number of flows, as indicated by No arrow 448 leading to Go To block 450, which jumps to decision step 452 (FIG. 4B). An exemplary threshold is 85% of the maximum number of flows. Nonetheless, those skilled in the art will understand that other thresholds may be used. The threshold may also be settable by a system administrator.

If the server 212 is using less than the threshold, the flow creator entity 302 may determine whether a memory structure can be allocated immediately, as indicated by Yes arrow 454 leading to decision step 456. If sufficient memory can be allocated immediately, the flow creator entity 302 may request allocation of a new memory structure for the flow from the memory manager, as indicated by Yes arrow 458 leading to step 460. That is, the flow creator entity 302 may issue a memory allocation (malloc) request to the memory manager. At this point, processing may return to step 446 (FIG. 4A) as indicated by Go To block 462 (FIG. 4B).

Returning to decision step 452 (FIG. 4B), if the number of flows being used exceeds the threshold, indicating resources are in short supply, then the flow creator entity 302 manages the flows by expiring an existing flow, taking the expired flow structure and assigning it to the new flow. In an embodiment, the flow creator entity also manages the existing flows if the memory manager cannot allocate a new memory structure immediately in response to decision step 456, as indicated by No arrow 468 leading to decision step 466. At step 466, the flow creator entity determines if there is a candidate flow that meets one or more criteria for removal. In an embodiment, the flow creator entity 302 utilizes three criteria or tests to identify an existing flow of the reply cache 300 that may be retired, as indicated by No arrow 464 also leading to decision step 466.

In an embodiment, the flow creator entity 302 searches for an existing flow: (1) whose TOLR exceeds a value, e.g., a threshold, such as eight (8) hours; (2) whose microcache is empty, i.e., there are no completed (or in progress) entries; or (3) whose TOLR timer exceeds another value, e.g., a second threshold, such as thirty (30) minutes, and whose RISLR counter exceeds yet another value, e.g., a third threshold. The RISLR value may be adjusted based on the size of the microcache, e.g., the total number of microcache entries 342, which as discussed above may be 100. In particular, the RISLR value may be divided by the total number of entries, e.g., 100, to generate an Adjusted RISLR Value (ARV). A flow's ARV provides an indication of the value of the entries to the client. An exemplary threshold for the ARV is four (4), although those skilled in the art will understand that other values may be used. When a flow's ARV reaches this value, the client has issued four times as many requests as held in the cache, thereby indicating that the entries in the cache are of low value to the client.

It should be understood that steps (1) to (3) are not order dependent. It should also be understood that a flow having one or more in-progress entries 362 should not be retired.

The flow creator entity 302 may apply these tests to the thirty oldest flows in the reply cache 300. Those skilled in the art will understand that the flow creator entity 302 may examine other flows for possible retirement. If the flow creator entity 302 locates a candidate flow that meets one of these three criteria or tests, it may retire that flow, as indicated by Yes arrow 470 leading to step 472. Processing may then resume at step 446 (FIG. 4A). If the flow creator entity 302 cannot locate a candidate flow that meets one of the three criteria or tests, it may determine whether the memory manager can allocate a new flow structure, as indicated by No arrow 474 leading to decision step 476. If so, processing may resume at step 460, as indicated by Yes arrow 478. If not, the flow creator entity 302 may retire the oldest existing flow, as indicated by No arrow 480 leading to step 482. Processing may then resume at step 446 (FIG. 4A).

The connection statistics defined by embodiments of the invention thus include the TOLR time, the RISLR count and the ARV. In an embodiment, the ARV is used in place of the RISLR. As described herein, these connection statistics provide, among other things, an indication of the value of the entries in a microcache to the respective client. Entries deemed to be of low value based on the connection statistics may be expired, while entries deemed to have a high value may be retained.

Reply Cache Scrubbing

In an embodiment, the scrubber engine 306 examines the reply cache 300 and deletes or retires entries 352 and entire microcaches 300 that are determined to be of low value. Retired flows may be returned to or placed on the free list 311. The scrubber engine 302 may be configured to run independently of the processing of client requests, as a thread within a server 212 running in the background with low priority. That is, it may be configured to run in an out-of-band manner. For example, the scrubber engine 306 may be configured to run periodically, e.g., every minute. FIG. 5 is a flow diagram of a method for scrubbing the reply cache 300 as implemented by the scrubber engine 306.

Operation may begin at start step 502. In an embodiment, the scrubber engine 306 may determine whether the number of flows being utilized by the server 212 exceeds some limit, such as 75 percent of the maximum number of flows, as indicated by decision step 504. If not, no scrubbing is performed on the reply cache 300, as indicated by No arrow 506 which loops back on step 504. That is, the scrubber engine 306 runs only when the reply cache 300 exceeds some size limit, such as a percentage of the reply cache's maximum size, the number of flows, etc. Nonetheless, those skilled in the art will understand that the scrubber engine 306 may be configured to run in response to other conditions. For example, the scrubber engine 306 may be configured to run continuously. Alternatively, the scrubber engine 306 may be launched by an administrator. In yet another embodiment, the scrubber engine 306 may be configured to monitor the free list 311 and, when the free list falls below some floor, such as five percent of the maximum number of flows, the scrubber engine 306 may be launched.

The scrubber engine 306 may start its examination with the oldest flow, as indicated by Yes arrow 508 leading to step 510. The scrubber engine may evaluate the TOLR timer for this flow, and determine whether it is less than a value, such as a Flow Inactivity Timeout (FIT), as indicated at decision step 512. The FIT may be set to thirty (30) minutes. If the TOLR for the current flow is less than FIT, then the flow is considered to be an active flow. In this case, the scrubber engine 306 examines the oldest entry 352 from the LRU list 350 for this flow, as indicated by Yes arrow 514 leading to step 516. The scrubber engine determines whether this candidate entry is older than a value specified for active flows, e.g., a Maximum Entry Lifetime Active Flow (MELAF), as indicated at decision step 518. In an embodiment, the MELAF is set to two (2) hours. It should be understood that the MELAF may be set to other values. It may also be tuned by a system administrator. If the candidate entry is older than the MELAF value, then the scrubber engine retires the entry, as indicated by Yes arrow 520 leading to step 522. That is, the data stored in the entry may be cleared, and the entry may be placed at the end of the LRU list 350 and marked unused or free.

The scrubber engine 306 then proceeds to determine if there are any un-examined entries of the current flow, as indicated at decision step 524. If there is at least one un-examined entry 352 in the current flow, then the scrubber engine 306 examines the oldest un-examined entry 352, as indicated by Yes arrow 528, which leads back to step 516. Each entry 352 of the current flow is thus examined by the scrubber engine, and if it is older than the MELAF, then it is retired and thus made available for a new request by the client connection associated with this flow. Returning to decision step 518, if the current entry being examined is not older than the MELAF value, then the entry is not retired, and the scrubber engine determines whether there are any other entry to be examined in the current flow, as indicated by No arrow 526, which skips step 522, and leads to step 524.

Returning to decision step 512, if the TOLR timer for the current flow is not less than the FIT value, then the current flow is considered to be inactive. In this case, the scrubber engine 306 once again examines the oldest, in-use entry 352 from the LRU list 350 for this flow, as indicated by No arrow 530 leading to step 532. The scrubber engine determines whether the this entry under examination is older than a value specified for inactive flows, e.g., a Maximum Entry Lifetime Inactive Flow (MELIF), as indicated at decision step 534. In an embodiment, the MELIF is set to eight (8) hours. It should be understood that the MELIF may be set to other values. It may also be tuned by a system administrator. However, as shown, the MELIF is higher than the MELAF, such that the entries of an active flow are retired sooner than the entries of an inactive flow.

If the current, in-use entry being examined is older than the MELIF value, then the scrubber engine retires the entry, as indicated by Yes arrow 536 leading to step 538. That is, the data stored in the entry may be cleared, and the entry may be placed at the end of the LRU list 350 and marked unused or free. The scrubber engine 306 then proceeds to determine if there are any un-examined entries of the current flow, as indicated at decision step 540. If there is at least one candidate entry 352 in the current flow, then the scrubber engine 306 proceeds to examine the oldest candidate entry 352, as indicated by Yes arrow 544, which leads back to step 532. Each entry 352 of the current flow is thus examined by the scrubber engine, and if it is older than the MELIF, then it is retired and thus made available for a new request by the client connection associated with this flow. Returning to decision step 534, if the current entry being examined is not older than the MELIF value, then the entry is not retired, and the scrubber engine determines whether there are any other candidate entries in the current flow, as indicated by No arrow 542, which skips step 538, and leads to step 540.

Once all of the entries of the current flow have been examined by the scrubber engine 306 and compared to either the MELAF or the MELIF value as appropriate, the scrubber engine 306 determines whether there are any remaining, in-use entries 352 or 362 in the current flow, as indicated by No arrows 546 and 548 which lead to decision step 550. If not, meaning there are no in-use entries 352, 362 for this flow, then the scrubber engine may retire the flow itself, as indicated by No arrow 552 leading to step 554. The retired flow is placed in the free list 311. If there is at least one entry 352, 362 still in-use for the current flow, then the flow is not retired, as indicated by Yes arrow 556, which skips step 554, and leads to decision step 558. Here, the scrubber engine 306 determines whether there are any remaining candidate flows in the reply cache 300. If so, processing returns to step 510, at which point the scrubber engine 306 accesses the oldest unexamined flow, as indicated by Yes arrow 560. If the scrubber engine 306 has processed each of the flows of the reply cache 300, processing returns to start block 502, as indicated by No arrow 562.

In an embodiment, while a client 110 using the TCP transport protocol to communicate with the storage system 120 will have its microcache retired when all of the entries are expired, a client using a connectionless transport protocol, such as UDP, will not have its microcache retired until all of the entries are expired and the flow's TOLR counter exceeds the FIT value.

The foregoing description has been directed to specific embodiments of this invention. It will be apparent, however, that other variations and modifications may be made to the described embodiments, with the attainments of some or all of their advantages. For example, reply cache entries may have other or additional states. Accordingly, this description is to be taken only by way of example and not to otherwise limit the scope of the invention. Therefore, it is the object of the appended claims to cover all such variations and modifications as come within the true spirit and scope of the invention.

What is claimed is:

1. A method for managing a flow based reply cache of a storage system having a processor and a memory, comprising:
organizing, by a flow creator entity of the storage system, the flow based reply cache into one or more microcaches, each microcache having a plurality of entries;
allocating, by the flow creator entity of the storage system, each microcache to a client of the storage system, such that each client has a set of entries that is not shared with other clients;
determining whether a given client is active or inactive;
expiring, by a scrubber engine of the storage system, entries of a microcache allocated to the given client based on a first value when the given client is determined to be active; and
expiring, by the scrubber engine of the storage system, the entries of the microcache allocated to the given client based on a second value that is different from the first value when the given client is determined to be inactive, wherein
the first and second values are selected such that, when the given client is determined to be active, its entries are expired earlier than when the given client is determined to be inactive.

2. The method of claim 1 wherein the first value corresponds to a first age and the second value corresponds to a second age.

3. The method of claim 1 wherein the second value is higher than the first value.

4. The method of claim 1 further comprising expiring the microcache allocated to the given client when all of the entries have been expired.

5. The method of claim 4 further comprising returning the expired microcache to a free list.

6. The method of claim 1 further comprising, when the given client utilizes a connectionless transport protocol to communicate with the storage system, expiring the microcache allocated to the given client when all of the entries have been expired and the storage system has not received a request from the given client for a specified time.

7. The method of claim 1 wherein the determining comprises:
maintaining for each client a timer that tracks a time since a last request was received by the storage system from a respective client;
designating the given client as active if the timer is one of less than or less than or equal to a timeout; and
designating the given client as inactive if the timer is one of greater than or equal to the timeout or greater than the timeout.

8. The method of claim 1 wherein the determining comprises:
maintaining for each client a timer that tracks a time since a last request was received by the storage system from a respective client;
designating the given client as active if the timer is less than approximately thirty minutes; and
designating the given client as inactive if the timer is greater than approximately thirty minutes, and wherein the first value is approximately two hours and the second value is approximately eight hours.

9. A method for managing a flow based reply cache of a storage system having a processor and a memory, comprising:
organizing, by a flow creator entity of the storage system, the flow based reply cache into one or more microcaches, each microcache having a plurality of entries;
allocating each microcache to a client of the storage system, such that each client has a set of entries that is not shared with other clients;
maintaining, by a request processing entity of the storage system, for at least one microcache, a timer configured to track a time since a last idempotent or non-idempotent request was received from a respective client;
expiring the at least one microcache when the timer either meets or exceeds a value.

10. The method of claim 9 further comprising placing the at least one microcache in a free list.

11. The method of claim 9 further comprising searching the reply cache for a microcache whose respective timer exceeds the value when utilization of the reply cache exceeds a limit.

12. The method of claim 11 wherein the limit is a percentage of a maximum number of permitted microcaches in the reply cache.

13. The method of claim 9 further comprising organizing the plurality of entries of the at least one microcache in a least recently used (LRU) order.

14. The method of claim 9 wherein the value is settable by a network administrator.

15. A method for managing a flow based reply cache of a storage system having a processor and a memory, comprising:
organizing the flow based reply cache into one or more microcaches, each microcache having a plurality of entries;
allocating each microcache to a client of the storage system, such that each client has a set of entries that is not shared with other clients;
maintaining, for at least one microcache, a timer configured to track a time since a last idempotent or non-idempotent request was received from a respective client;
maintaining, for the at least one microcache, a counter configured to count a number of idempotent requests received from the respective client since receiving a last non-idempotent request from the respective client; and
expiring the at least one microcache when the timer either meets or exceeds a first value, and the counter either meets or exceeds a second value.

16. The method of claim 15 wherein the counter is adjusted based on a size of the at least one microcache to produce an adjusted count, and the adjusted count either meets or exceeds the second value.

17. The method of claim 16 wherein the adjusted count is generated by dividing the count by a total number of entries of the at least one microcache.

18. The method of claim 17 wherein the first value is at least approximately thirty minutes, and the second value is at least equal to approximately four times the total number of entries of the at least one microcache.

19. The method of claim 15 further comprising allocating the at least one expired microcache to a new client flow.

20. The method of claim 15 wherein the reply cache entries are in one of a following three states: unused, in progress, and completed.

21. A storage system comprising:
a processor;
a memory coupled to the processor;
a flow based reply cache implemented in the memory and having a plurality of microcaches, each microcache having a plurality of entries configured to store replies of the storage system;
a protocol server configured to maintain each microcache and allocate each microcache to a client of the storage system, such that each client has its own pool of reply cache entries that is not shared with other clients of the storage system; and
a scrubber engine configured to:
 determine whether a given client of the storage system is active or inactive,
 expire entries of the microcache allocated to the given client based on a first value when the given client is determined to be active, and
 expire the entries of the microcache allocated to the given client based on a second value that is different from the first value when the given client is determined to be inactive, wherein
  the first and second values are selected such that, when the given client is determined to be active, its entries are expired sooner than when the given client is determined to be inactive.

22. A storage system comprising:
a processor;
a memory coupled to the processor;
a flow based reply cache implemented in the memory and having a plurality of microcaches, each microcache having a plurality of entries configured to store replies of the storage system;
a protocol server configured to maintain each microcache and allocate each microcache to a client of the storage system, such that each client has its own pool of reply cache entries that is not shared with other clients of the storage system; and
a flow creator entity configured to:
 maintain, for at least one microcache, a timer configured to track a time since a last idempotent or non-idempotent request was received from a respective client;
 maintain, for the at least one microcache, a counter configured to count a number of idempotent requests received from the respective client since receiving a last non-idempotent request from the respective client;
 adjust the count based on the total number of entries of the at least one microcache to produce an adjusted count; and
 expire the at least one microcache when the timer either meets or exceeds a first value, and the adjusted count either meets or exceeds a second value.

23. The storage system of claim 22 wherein the flow creator entity is further configured to assign the at least one expired microcache to a new client flow.

24. A non-transitory computer-readable storage medium containing executable program instructions executed by a processor, comprising:
program instructions that establish a flow based reply cache of a storage system;
program instructions that organize the flow based reply cache into one or more microcaches, each microcache having a plurality of entries;
program instructions that allocate each microcache to a client of the storage system, such that each client has a set of entries that is not shared with other clients;
program instructions that maintain, for at least one microcache, a timer configured to track a time since a last idempotent or non-idempotent request was received from a respective client;
program instructions that maintain, for the at least one microcache, a counter configured to count a number of idempotent requests received from the respective client since receiving a last non-idempotent request from the respective client;
program instructions that adjust the count based on a size of the at least one microcache to produce an adjusted count; and
program instructions that expire the at least one microcache when the timer either meets or exceeds a first value, and the adjusted count either meets or exceeds a second value.

* * * * *

UNITED STATES PATENT AND TRADEMARK OFFICE
CERTIFICATE OF CORRECTION

PATENT NO. : 8,171,227 B1
APPLICATION NO. : 12/401993
DATED : May 1, 2012
INVENTOR(S) : Jason L. Goldschmidt et al.

Page 1 of 1

It is certified that error appears in the above-identified patent and that said Letters Patent is hereby corrected as shown below:

Col. 6, line 46 should read: "index nodes ("~~modes~~inodes") to identify files and file attributes"

Col. 6, lines 50-52 should read: "include, among others, an ~~mode~~inode file. A file handle, i.e., an identifier that includes an ~~mode~~inode number, is used to retrieve an ~~mode~~inode from disk."

Col. 6, line 64 should read: "~~mode~~inode file using the ~~mode~~inode number to access an appropriate"

Signed and Sealed this
Tenth Day of July, 2012

David J. Kappos
*Director of the United States Patent and Trademark Office*